United States Patent
Maybee et al.

(10) Patent No.: US 8,689,196 B2
(45) Date of Patent: Apr. 1, 2014

(54) DISPLAY OF DATA FROM PARALLEL PROGRAMMING CONTEXTS

(75) Inventors: Paul E. Maybee, Seattle, WA (US); Daniel Moth, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 552 days.

(21) Appl. No.: 12/965,705

(22) Filed: Dec. 10, 2010

(65) Prior Publication Data

US 2012/0151447 A1 Jun. 14, 2012

(51) Int. Cl.
G06F 9/45 (2006.01)
G06F 9/44 (2006.01)

(52) U.S. Cl.
USPC ............ 717/149; 717/124; 717/129; 717/151

(58) Field of Classification Search
None
See application file for complete search history.

(56) References Cited

U.S. PATENT DOCUMENTS

| | | | |
|---|---|---|---|
| 6,275,956 B1 | 8/2001 | On et al. | |
| 7,203,926 B2 | 4/2007 | Bogle et al. | |
| 8,230,410 B2 * | 7/2012 | Loen ............... | 717/151 |
| 8,239,845 B2 * | 8/2012 | Stefansson et al. ........... | 717/149 |
| 8,239,846 B2 * | 8/2012 | Luszczek et al. ............. | 717/149 |
| 8,239,847 B2 * | 8/2012 | Yu et al. .......................... | 717/149 |
| 8,250,550 B2 * | 8/2012 | Luszczek et al. ............. | 717/149 |
| 8,261,250 B2 * | 9/2012 | Babaian et al. ............... | 717/151 |
| 8,429,622 B2 * | 4/2013 | Nanjundaswamy ........... | 717/129 |
| 8,572,578 B2 * | 10/2013 | Stall ............... | 717/129 |
| 2006/0101405 A1 * | 5/2006 | Buschardt et al. ............ | 717/124 |
| 2007/0234017 A1 * | 10/2007 | Moyer ........................... | 712/227 |
| 2008/0209405 A1 * | 8/2008 | Roberts et al. ................ | 717/129 |
| 2009/0013313 A1 * | 1/2009 | Kato et al. ..................... | 717/129 |
| 2012/0151445 A1 * | 6/2012 | Maybee ........................ | 717/124 |

OTHER PUBLICATIONS

F. Siebert, Concurrent, parallel, real-time garbage-collection, Jun. 2010, 10 pages.*
Sadowski et al., Practical parallel and concurrent programming, Mar. 2011, 6 pages.*
"HP Visual Inspect Software", Oct. 8, 2010 (Retrieved Date), (11 pages).
Holger Brunst, "Tuning Parallel MPI Programs with Vampir", Pub. Date Sep. 2008, (17 pages).
Christian Clemencon et al., "Visualization, Execution Control and Replay of Massively Parallel Programs within Annai's Debugging Tool", Pub. Date: Jul. 1995, (pp. 393-404).
Peter Brezany et al., "DeHiFo—An Advanced HPF Debugging System", Jun. 29, 2007, (11 pages).
TotalView Technologies—Linux Debugger and Memory Leak Detection, http://www.totalviewtech.com, Jul. 25, 2008, (1 page).
DDT on Franklin and Hopper, http://www.nersc.gov/nusers/systems/hopper/performance/debugger.php, Oct. 8, 2010 (Retrieved Date), (4 pages).
Important information about the NVIDIA Parallel Nsight™ 1.0 Jul. 2010 release, Oct. 8, 2010 (Retrieved Date), (11 pages).

* cited by examiner

*Primary Examiner* — Thuy Dao
(74) *Attorney, Agent, or Firm* — Brian Haslam; Kevin Sullivan; Micky Minhas

(57) ABSTRACT

The display of a debugging interface for use with parallel computing. When a break state has been entered in a particular code context (such as a method) by a particular execution context (such as a thread), related execution contexts are found that were also executing in the particular code context. While in the break state, multiple expressions are then evaluated for each of the execution contexts. The results are then displayed with perhaps navigation controls that allow the results to be efficiently navigated.

17 Claims, 3 Drawing Sheets

DISPLAY OF DATA FROM PARALLEL PROGRAMMING CONTEXTS

BACKGROUND

In order to reduce execution time, some computing tasks can be subdivided into smaller tasks that can be executed concurrently in separate processes supported by a parallel computing environment. Parallel computing environments use multiple processor cores to execute parallel processes. For instance, parallel computing systems may contain any plural number of processor cores, from as few as two to as much as thousands, though there is no theoretical limit on the maximum number of processor cores that may be present on a parallel computing environment.

Computation that involves parallel code often contains multiple threads of control that are all executing the same code simultaneously. An example of this may be found in data parallel computation, in which a data set is processed in a function in which there is no interdependencies between the processing of one portion of the data set and another portion of the data set. In that case, the data set may be divided, with each portion assigned to a method that applies the processing to that portion. The methods that process the data are different instances of the same method. With multiple instances of the methods operating concurrently against different portions of the data set, the data is processed much more quickly.

In any debugging task, the developer builds up a mental model of the state of the computation. The same is true of debugging parallel code. A program debugger helps with this task by allowing the developer to navigate the program state and display data describing that state. For instance, the program debugger may display thread stacks and the program data structure contents. For parallel code, there tends to be many stacks and more data to understand.

BRIEF SUMMARY

At least one embodiment described herein relates to the display of a debugging interface for use with parallel computing. When a break state has been entered in a particular code context (e.g., a particular method, function, or kernel) by a particular execution context (e.g., a particular thread, task, or rank depending on the programming model), related execution contexts are found that were also executing in the particular code context. Then, multiple expressions are then evaluated for each of the execution contexts. The results are then displayed. As an example, the results may be navigated in a wide variety of ways including allowing the user to focus on one of the multiple execution contexts, thereby allowing a more focused user interface to appear. The evaluation of multiple expressions as applied to multiple related execution contexts, especially in combination with the navigability of the results, makes it much easier to interpret the volume of data often encountered when debugging parallel programs.

This summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a parallel computing debugging interface provides extensive visualization for use in debugging parallel programs. When a break state has been entered in a particular code context (e.g., a particular method, function, or kernel) by a particular execution context (e.g., a particular thread, task, or rank depending on the programming model), related execution contexts are found that were also executing in the particular code context. Then, multiple expressions are then evaluated for each of the execution contexts. The results may then be displayed and navigated. First, some introductory discussion regarding computing systems will be described with respect to FIG. 1. Then, the embodiments of the debugging interface will be described with respect to FIGS. 2 and 3.

Figure 1:
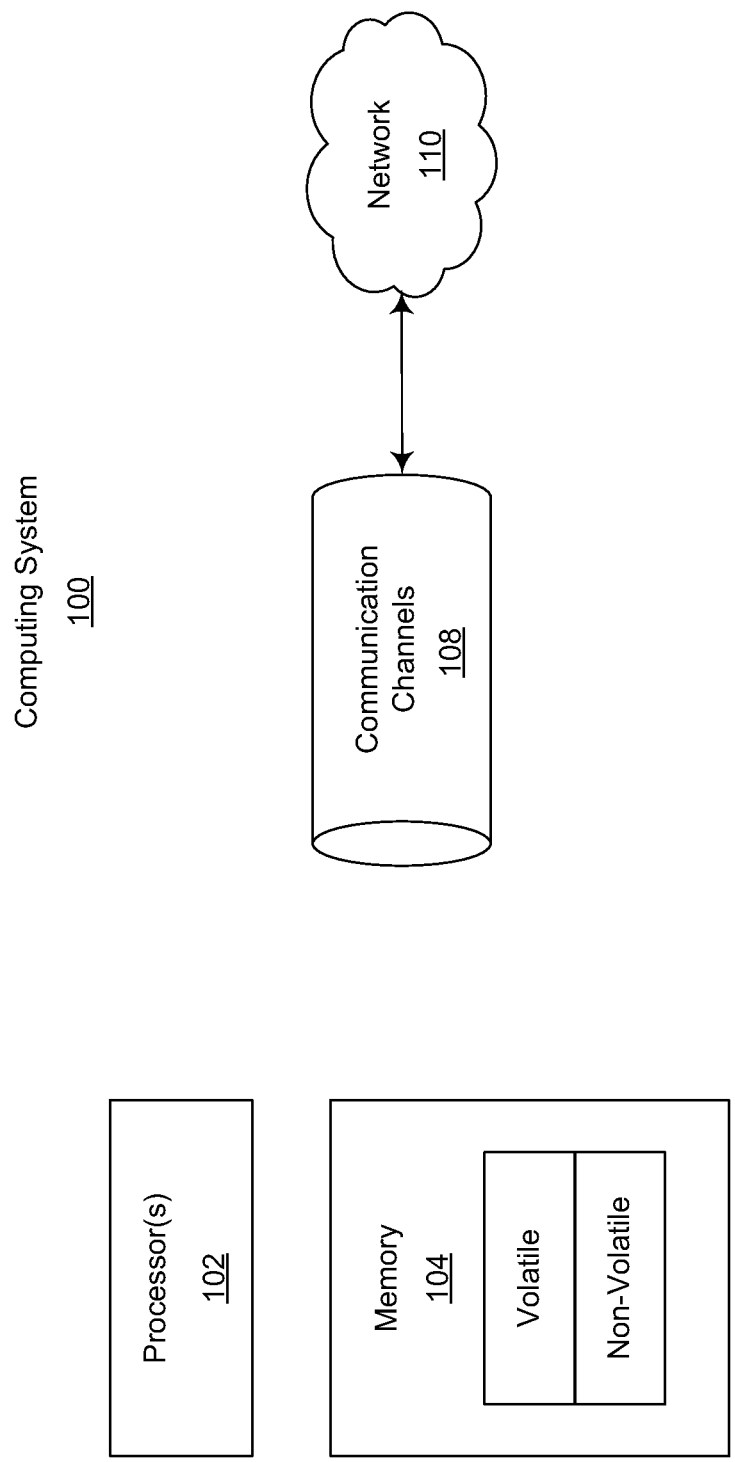
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems. As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system 100 may also have a display 112, on which the user interfaces illustrated and described herein may be displayed to a user.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
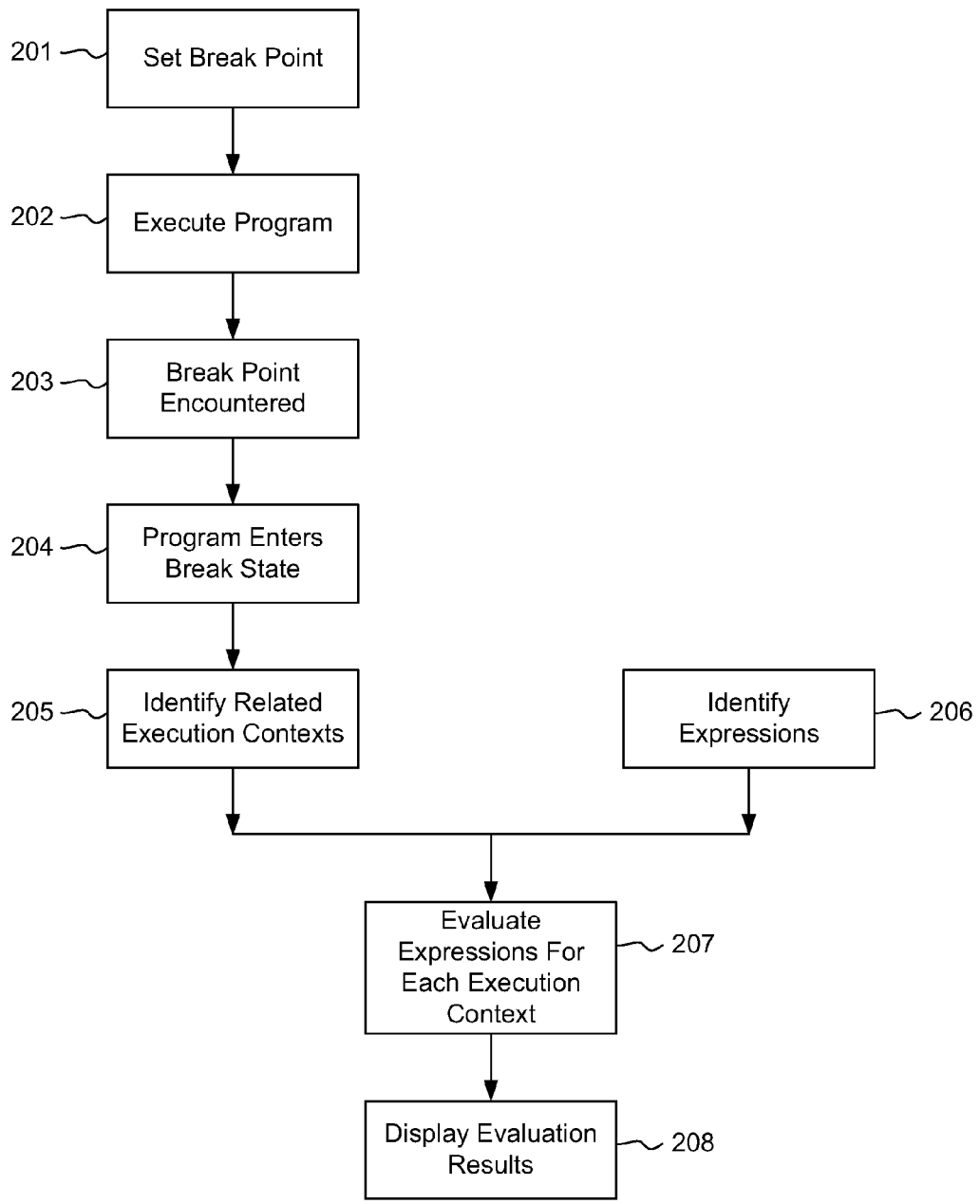
FIG. 2 illustrates a flowchart of a method for debugging a parallel program in accordance with the principles described herein.

FIG. 2 illustrates a flowchart of a method 200 for presenting a parallel computing debugging user interface for debugging of a parallel program code. The method 200 includes the setting of a break point (act 201) in a particular code context of a parallel program code. As software authors draft software code, the code is rarely perfectly functional as intended when first authored, especially for more complex software. Accordingly, the software goes through a "debugging" phase in which all unintended functionality of flawed functionality (often referred to in the industry as "bugs") are preferably removed.

One helpful tool for debugging is to set break points in the software, and then execute the software. When the software encounters the break point, the execution pauses. The various parameter values may then be analyzed to determine if the parameter values are as expected. If unexpected parameter values are found, that may provide a useful clue as to the cause of the software bug, and perhaps lead to a fix that will remove the bug.

As previously mentioned, the breakpoint is set in a particular code context of a parallel program code (act 201). The particular "code context" is a code portion that represents perhaps a portion of the overall parallel program code. As an example, the code portion may be a method or a function. As another example, the code portion may be a kernel in the case where parallel program functionality is offloaded to a graphics processing unit or other auxiliary processing device. The break point may be set by debugging software in response to a user instruction to set the break point.

There are a wide variety of break points that are traditionally used by debugging software, and the principles described herein are not limited to the particular type of break points. For instance, the break points may be conditional break points that are triggered if encountered only if certain one or more conditions are met. The break points may be step break points in which the break point is moved forward one instruction at a time, and so forth. The break point may also be a standard unconditional break point as well. The method 200 may be performed regardless of the number of break points set throughout the parallel program.

The parallel program code is executed (act 202) using concurrent execution contexts. The execution contexts are the mechanisms that perform concurrent execution. The principles described herein are not limited to the type of the execution contexts, but the execution contexts may differ depending on the programming model of the parallel program. One of the benefits of the principles described herein is that the user interface may be used regardless of the programming model and types of execution contexts. Several examples will be provided, though the principles described herein are not limited to such examples.

For instance, if the programming model were a pure thread-based programming model, the execution contexts would be threads and would be identifiable by a thread identifier. If the programming model were a message passing interface (MPI) programming model, the execution contexts would be a rank in which each of the execution contexts would be identified by a rank identifier. If the programming model were a C++ programming model or a .NET programming model, the execution contexts may be tasks or threads in which each of the execution contexts are identified by a task or thread identifier. If the programming model were a graphical processing unit programming model, the execution contexts may be a pairing of a thread group and a thread, in which each of the execution contexts are identified by a thread group identifier and a thread identifier combination.

At some point during execution, the system detects that a particular execution context has encountered the break point (act 203) that was set in the particular code context. For instance, in thread-based programming, the system detects that a particular thread has encountered a particular break point set in a particular method. This causes the entire parallel program to enter a break state (act 204). In the break state, the program pauses execution, and the state of the program is preserved at the time it entered the break state. The program may be resumed at some point, but until then, the state of the program may be examined to diagnose whether the program is operating as expected at that point, and if not, what is causing the problem.

In the break state, the system identifies a set of related execution contexts (act 205). This set of related execution contexts may include all or a subset that includes the particular execution context that encountered the break point in the particular code context, as well as one or more other execution contexts that are related in the fact that they also were executing in that particular code context at the time the program entered the break state when the first execution context encountered the break point. For instance, in thread-based programming, the related set of threads might include the thread that encountered the break point in a particular method, as well as other threads that were executing in that particular method at the time the program entered the break state. The related set of execution contexts may be identified by analyzing the call stack of the execution context, since the call stack will reveal what portion of the program the execution context was operating in at any given time.

The user also identifies multiple expressions (act 206) that are to be evaluated in the break state for the particular code context. The act of identifying these expressions are illustrated in parallel with the other acts described to this point because the method 200 is not strictly dependent on when the expressions are identified. They may be set well before even the break point is set (act 201), or they may be set even while in the break state (after act 204), or even after the related execution contexts are identified (after act 205). They are nevertheless, identified (act 206) before they are evaluated (act 207). Once the user enters the expression information, the system detects the user input that identifies the expressions to be evaluated.

Given that the set of expressions is identified (act 206 is complete), and given that the set of related execution contexts is identified (act 205 is complete), the system then evaluates each expression (act 207) for each of the set of related execution contexts. This evaluation occurs while in the break state. The expression may be as simple as a simple parameter value, or it may be much more complex, so long as the expression is written in a manner that the system can evaluate.

The system then displays the evaluation results (act 208) on a display while in the break state. For instance, the evaluation results may be displayed on the display 112 of the computing system 100 of FIG. 1. In one embodiment, the evaluation results are displayed on a dual axis grid with the expressions listed on one axis and the execution contexts listed on the other axis.

Figure 3:
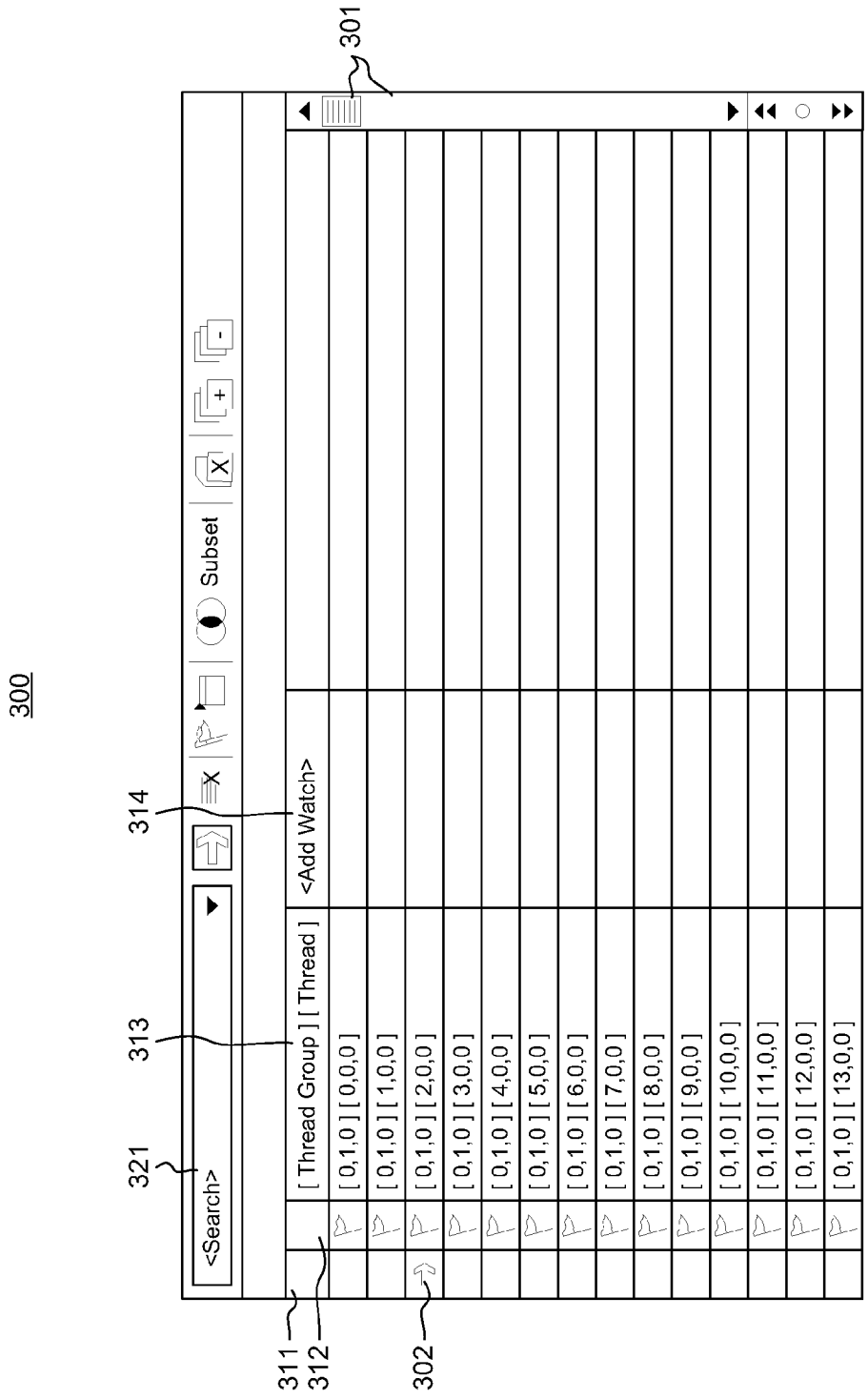
FIG. 3 illustrates a user interface in which multiple expressions may be evaluated for each of a number of related execution contexts.

FIG. 3 illustrates an example of a user interface 300 that uses such a dual axis grid and that include a number of other controls and elements that allow the user to have a rich navigation experience. The user interface 300 will now be described in detail.

The user interface 300 provides a vector visualization mechanism for visualizing expression values across execution contexts. For instance, in FIG. 3, the user interface 300 lists the related execution contexts, one for each row, with the execution context identified in the execution contexts column 313. In the illustrated embodiment, the programming model uses thread group and thread combinations to identify the execution context. However, the execution contexts column 313 is flexible in that it adjusts to the programming model of the parallel program being debugged. For instance, the execution contexts column 313 may list rank identifiers, task identifiers, or whatever execution context identifiers are appropriate for the programming model.

The scroll bar control 301 may be used to scroll down and up in the case in which there are more execution contexts in the list than can be simultaneously displayed in the user interface 300. In the illustrated case, only 14 threads are illustrated as identified in the execution contexts column 313, each included within thread group [0,1,0] and are listed from thread [0,0,0] to thread [13,0,0].

The user interface provides an expression add or edit mechanism 314 that permits a user to edit the expressions that are to be evaluated at the break point. The user may, for example, select mechanism 314, which allows the user to enter an expression for that column. The corresponding rows of that column are then populated with the resulting evaluated value corresponding to each execution context. The <Add Watch> control will, however, remain (albeit shifted right one column), to allow the user to add multiple expressions, one for each column. To edit an expression for a particular column, the user may perhaps simply select the column header, allowing the user to further refine the expression. Thus, perhaps even dozens of expressions may be added and evaluated against the set of related execution contexts of the corresponding break point.

The user may add or edit expressions either before execution of the parallel program begins, after the breakpoint is encountered, or sometime inbetween (e.g., at a prior break point in the execution). In response to the user editing and/or adding an expression in the break state, the expressions are reidentified (act 206), reevaluated for each execution context (act 207), and the display is updated accordingly (act 208).

The user interface 300 includes a focus column 311. An arrow 302 in the focus column 311 shows the current focus of the execution context. Initially, the arrow may identify the execution context that encountered the break point to cause the program to enter the break state. However, the user may select one of the rows in the user interface to allow the user to view a context user interface that focuses on the selected execution context, and causing the arrow to move to the selected execution context. For instance, a new interface may appear that shows the user the code of the parallel program, and where the execution context was executing in the code at the time the program entered the break state. The new interface may also show the various parameter and/or expression values in a different form.

The user interface 300 also includes a flagging mechanism in the form of flag column 312. The user may select the flag in the column corresponding to the execution context that the user would like to flag. Execution contexts may be flagged for user reference and/or perhaps for different treatment by the system. For instance, the user may have an option to display only flagged execution contexts, allowing the user to focus on a reduced set of execution contexts.

The user interface 300 may allow for efficient searching, sorting and groups. For instance, the search field 321 allows the user to search for one or more expression values of a particular expression. For instance, the user might search for all expression values of a particular expression that have a negative value, or that have a value within a search range, or that have a value that is or is not one of a particular set of values.

The user interface 300 provides a sorting mechanism (by a user gesture on the selected expression column) that allows the user to sort expression values for a particular expression. For instance, the user might select to have rows sorted by descending expression value on a particular expression.

The user interface 300 provides a grouping mechanism (e.g., a user gesture on the selected expression column) that allows the user to group expression values for a selected expression. For instance, such grouping may quantize corresponding expression values into a distinct number (e.g., four) of groups. Each of those groups may then be collapsed and expanded (causing the corresponding rows to hide and reveal the corresponding rows), thereby allowing the user to focus on particular execution context(s) of interest.

The user interface also includes an execution context subset selection mechanism 323 that allows the user to specify only a subset of the execution contexts to display based on one or more selection criteria. For instance, the user might specify to select and visualize only every tenth execution context. This allows the number of displayed execution contexts to be reduced to only a sample, which is helpful when the total number of execution contexts may number in the hundreds or even thousands.

To assist with debugging, multiple windows may be open, each showing a user interface 300, but perhaps each window corresponding to different sets of expressions. Visualization of complex values (such as structures) may be performed as well given the limited space associated with the intersection of a row and expression column. For example, the user might hover over a particular complex value, causing a more comprehensive visualization to appear (e.g., an expanded tree structure). The user might do some gesture to indicate an intent to add one of the subvalues as an additional expression, causing evaluation of that subvalue for each execution context. In one embodiment, the grid structure may be exported to a spreadsheet, allowing the values to be analyzed using spreadsheet functionality.

Accordingly, the principles described herein provide a mechanism for evaluating multiple expression values for multiple related execution contexts and visualizing the resulting values. In addition, rich navigation functionality is also described that allows the user to evaluate the results. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for presenting a parallel computing debugging user interface, the method comprising:
   an act of setting a break point in a particular code context of a parallel program code;
   an act of executing the parallel program code, including performing a parallel execution of a plurality of execution contexts, wherein performing the parallel execution of the plurality of execution contexts includes simultaneously executing the same particular program code context of the parallel program code with each of the plurality of execution contexts;
   an act of detecting that a particular execution context of the plurality of execution contexts has encountered the break point while executing the particular program code context, thereby causing the parallel program code to enter a break state;
   an act of detecting user input that identifies a plurality of expressions to be evaluated in the break state for the particular code context;
   an act of identifying the plurality of related execution contexts that were executing the particular program code context when the break state was encountered, including identifying (i) the particular execution context that encountered the break point, and (ii) one or more execution contexts of the plurality of execution contexts that were also executing in the particular code context at the time that the particular execution context encountered the break point;
   an act of evaluating each of the plurality of expressions in each of the plurality of related execution contexts while in the break state;
   an act of displaying results of the act of evaluating on a user interface while in the break state; and
   in response to a user manipulation of an expression add or edit mechanism at the user interface while in the break state:
      an act of detecting that user input at the add or edit mechanism re-identifies the plurality of expressions while in the break state;
      an act of reevaluating each of the re-identified plurality of expressions in each of the plurality of execution contexts while in the break state; and
      an act of redisplaying results of the act of reevaluating on the user interface while in the break state.

2. A computer program product comprising one or more memory storage devices having stored thereon computer executable instructions, that when executed by one or more processors of a computing system, causes the computing system to perform the following:
   an act of executing a parallel program, including performing a parallel execution of a plurality of execution contexts, wherein performing the parallel execution of the plurality of execution contexts includes simultaneously executing the same particular program code context of the parallel program with each of the plurality of execution contexts;
   an act of detecting that a particular execution context of the plurality of execution contexts of the parallel program has entered a break state while executing the particular program code context of the parallel programming code;

an act detecting user input that identifies a plurality of expressions to be evaluated in the break state for the particular program code context;

an act of identifying the plurality of execution contexts that were executing the particular program code context when the break state was encountered, including identifying (i) the particular execution context that entered the break state, and (ii) one or more additional execution contexts of the plurality of execution contexts that were also executing in the particular program code context when the break state was entered;

an act of evaluating each of the plurality of expressions in each of the plurality of execution contexts while in the break state;

an act of displaying results of the act of evaluating on a user interface while in the break state; and in response to a user manipulation of an expression add or edit mechanism at the user interface while in the break state:

an act of detecting that user input at the add or edit mechanism re-identifies the plurality of expressions while in the break state;

an act of reevaluating each of the re-identified plurality of expressions in each of the plurality of execution contexts while in the break state; and an act of redisplaying results of the act of reevaluating on the user interface while in the break state.

3. The computer program product in accordance with claim 2, wherein the displayed results include a dual axis grid with the plurality of expressions listed on one axis and the plurality of execution contexts listed on the other axis.

4. The computer program product in accordance with claim 2, wherein the user interface provides a context focus mechanism that allows the user to view a context user interface that focuses on an associated execution context of the plurality of execution contexts.

5. The computer program product in accordance with claim 2, wherein the plurality of execution contexts may be execution contexts from any of a plurality of programming models.

6. The computer program product in accordance with claim 5, wherein one of the plurality of programming models comprises a thread programming model in which each of the plurality of execution contexts are identified by a thread identifier.

7. The computer program product in accordance with claim 5, wherein one of the plurality of programming models comprises a message passing interface programming model in which each of the plurality of execution contexts are identified by a rank identifier.

8. The computer program product in accordance with claim 5, wherein one of the plurality of programming models comprises a C++ programming model in which each of the plurality of execution contexts are identified by a task or thread identifier.

9. The computer program product in accordance with claim 5, wherein one of the plurality of programming models comprises a .NET programming model in which each of the plurality of execution contexts are identified by a task or thread identifier.

10. The computer program product in accordance with claim 5, wherein one of the plurality of programming models comprises a graphical processing unit programming model in which each of the plurality of execution contexts are identified by a thread group identifier and a thread identifier.

11. The computer program product in accordance with claim 2, wherein the user interface provides a sorting mechanism that allows the user to sort expression values for a particular expression of the plurality of expressions.

12. The computer program product in accordance with claim 2, wherein the user interface provides a grouping mechanism that allows the user to group expression values for a particular expression of the plurality of expressions.

13. The computer program product in accordance with claim 2, wherein the user interface provides a searching mechanism that allows the user to search for one or more expression values of a particular expression of the plurality of expressions.

14. The computer program product in accordance with claim 2, wherein the user interface provides a flagging mechanism that allows the user to flag one or more execution contexts of the plurality of execution contexts, wherein the flagged execution context(s) may be treated different than unflagged execution context(s) in subsequent treatment by the user interface.

15. The computer program product in accordance with claim 2, wherein the user interface provides an execution context selection mechanism that allows the user to specify only a subset of the plurality of execution contexts to display based on one or more selection criteria.

16. The computer program product in accordance with claim 2, wherein the user interface provides a vector visualization mechanism for visualizing expression values across execution contexts.

17. A computer system, comprising:

one or more processors; and one or more computer storage media having thereon computer executable instructions, that when executed by the one or more processors, causes the computing system to perform the following:

an act of executing a parallel program, including performing a parallel execution of a plurality of execution contexts, wherein performing the parallel execution of the plurality of execution contexts includes simultaneously executing the same particular program code context of the parallel program with each of the plurality of execution contexts;

an act of detecting that a particular execution context of the plurality of execution contexts of the parallel program has entered a break state while executing the particular program code context of the parallel programming code;

an act detecting user input that identifies a plurality of expressions to be evaluated in the break state for the particular program code context;

an act of identifying the plurality of execution contexts that were executing the particular program code context when the break state was encountered, including identifying (i) the particular execution context that entered the break state, and (ii) one or more additional execution contexts of the plurality of execution contexts that were also executing in the particular program code context when the break state was entered;

an act of evaluating each of the plurality of expressions in each of the plurality of execution contexts while in the break state;

an act of displaying results of the act of evaluating on a user interface while in the break state; and in response to a user manipulation of an expression add or edit mechanism at the user interface while in the break state:

an act of detecting that user input at the add or edit mechanism re-identifies the plurality of expressions while in the break state;

an act of reevaluating each of the re-identified plurality of expressions in each of the plurality of execution contexts while in the break state; and an act of redisplaying results of the act of reevaluating on the user interface while in the break state.

\* \* \* \* \*